United States Patent
Tsuchiya (10) Patent No.: US 7,667,424 B2
(45) Date of Patent: Feb. 23, 2010

(54) SERVO DEVICE

(75) Inventor: Hiroyuki Tsuchiya, Chiba (JP)

(73) Assignee: Futaba Corporation (CN)

( * ) Notice: Subject to any disclaimer, the term of this patent is extended or adjusted under 35 U.S.C. 154(b) by 56 days.

(21) Appl. No.: 11/739,882

(22) Filed: Apr. 25, 2007

(65) Prior Publication Data

US 2007/0262742 A1    Nov. 15, 2007

(30) Foreign Application Priority Data

Apr. 26, 2006  (JP) ............................. 2006-121982
Mar. 30, 2007  (JP) ............................. 2007-092447

(51) Int. Cl.
*G05B 1/06* (2006.01)

(52) U.S. Cl. ...................... 318/652; 318/599; 318/560; 318/400.01; 318/254.1

(58) Field of Classification Search .................... 318/9, 318/11, 12, 15, 700, 400.01, 400.07, 560, 318/599, 254.1, 652

See application file for complete search history.

(56) References Cited

U.S. PATENT DOCUMENTS

| | | | |
|---|---|---|---|
| 3,699,708 A | | 10/1972 | Mabuchi |
| 4,608,527 A | | 8/1986 | Glennon et al. |
| 4,782,272 A | * | 11/1988 | Buckley et al. .......... 318/400.01 |
| 4,983,895 A | * | 1/1991 | Koharagi et al. ........ 318/400.12 |
| 5,294,872 A | * | 3/1994 | Koharagi et al. ........ 318/400.15 |
| 5,532,561 A | | 7/1996 | Huang |
| 5,821,707 A | * | 10/1998 | Kim ....................... 318/400.01 |
| 5,821,713 A | | 10/1998 | Holling et al. |
| 5,847,530 A | * | 12/1998 | Hill .............................. 318/599 |
| 6,427,104 B1 | * | 7/2002 | Matsushita et al. ............. 701/41 |
| 6,433,496 B1 | | 8/2002 | Kawagoshi |
| 6,459,225 B1 | * | 10/2002 | Maruyama .................. 318/560 |
| 6,534,948 B2 | * | 3/2003 | Ohura et al. ................. 318/798 |
| 6,713,983 B2 | * | 3/2004 | Maruyama .................. 318/560 |
| 6,906,492 B2 | * | 6/2005 | Matsushita .................. 318/727 |
| 7,112,936 B2 | * | 9/2006 | Lee ........................ 318/400.01 |
| 7,298,109 B2 | * | 11/2007 | Sakamaki et al. ............ 318/489 |

FOREIGN PATENT DOCUMENTS

| | | |
|---|---|---|
| DE | 2161223 B2 | 8/1975 |
| DE | 4412413 C1 | 11/1995 |

(Continued)

OTHER PUBLICATIONS

German communication dated Oct. 27, 2009. English language translation attached to front of document.

*Primary Examiner*—Bentsu Ro
*Assistant Examiner*—Thai Dinh
(74) *Attorney, Agent, or Firm*—Quarles & Brady LLP (57) ABSTRACT

A servo device is provided which includes a drive source made of a brushless motor. A DC motor driving integrated circuit produces output signals and controls the output of a three-phase brushless motor driving integrated circuit to drive the brush less motor. A selection switching section detects information regarding the rotational speed of the brushless motor. The selection switching section extracts the counter electromotive voltage of the brushless motor, feeds the voltage back to the DC motor driving integrated circuit and PWM controls a drive signal output from the three-phase brushless motor driving integrated circuit. This allows the brushless motor to be easily applied to the servo device.

5 Claims, 10 Drawing Sheets

FOREIGN PATENT DOCUMENTS

| | | |
|---|---|---|
| DE | 10219438 | 11/2003 |
| DE | 10338211 A1 | 4/2004 |
| JP | 59156182 | 9/1984 |
| JP | 10084692 | 3/1998 |
| JP | 10285971 | 10/1998 |

\* cited by examiner

FIG.2

TIMING CHART

NORMAL ROTATION (POSITION DETECTION
SIGNAL ADVANCES Ha→Hb→Hc)

REVERSE ROTATION (POSITION DETECTION
SIGNAL ADVANCES Ha→Hc→Hb)

SERVO DEVICE

CROSS REFERENCE TO RELATED APPLICATIONS

This application claims the priority benefit of Japanese Patent Applications No. 2006-121982 filed on Apr. 26, 2006 and No. 2007-092447 filed on Mar. 30, 2007.

STATEMENT REGARDING FEDERALLY SPONSORED RESEARCH

Not Applicable

BACKGROUND OF THE INVENTION

1. Field of the Invention

The present invention relates to a servo device for driving a controlled object based on input control signals. For example, the present invention relates to a servo device suitable for industrial radio control, radio control for models, remote control to robots, and the like, operated based on control signals transmitted with radio waves.

2. Description of the Prior Art

Radio controlled devices (hereinafter referred to as R/C) are in widespread use, as devices each which moves with control information carried with radio waves from a transmitter and at an area remote from an operator, or as devices each which manipulates a controlled body. The radio control devices generally manipulate controlled bodies including model cars, model air-planes, model ships, robots, and the like.

In such a radio control device, a servo system is equipped as an actuator that drives a control object in a controlled body. The servo system is mounted on the controlled body and drives the control object of the controlled body based on control signals, which are transmitted by a transmitter and received by a receiver.

Figure 7:
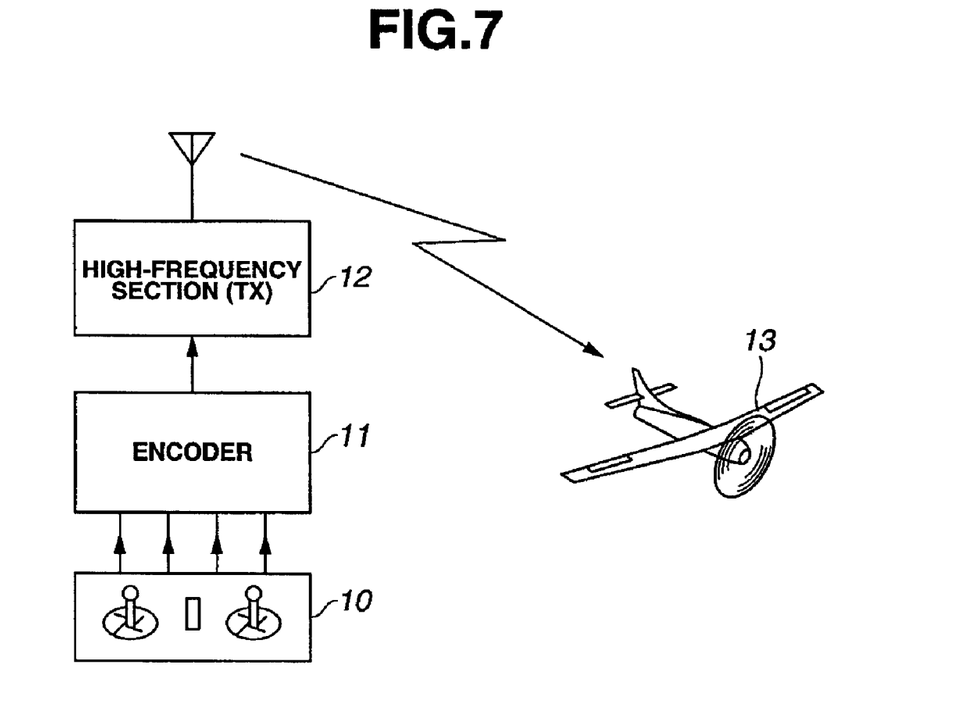
FIG. 7 is a diagram explaining a radio controlled device.

FIG. 7 shows an outline of such a radio control device (system). A control panel 10 that manipulates an airborne object 13 or a controlled body includes joysticks and various setting switches.

An encoder 11, for example, pulse-width modulates various control signals output from the control panel 10, and converts them into a chain of pulses cycled in a predetermined frame period.

A pulse chain in one frame unit, cycled in a predetermined frame period, is always supplied to the high-frequency section 12 (transmission section) during manipulation. For example, AM or FM modulated radio waves are transmitted to an airborne object 13.

The radio control device includes the control panel 10, an encoder 11 and a high-frequency section 12.

Figure 8:
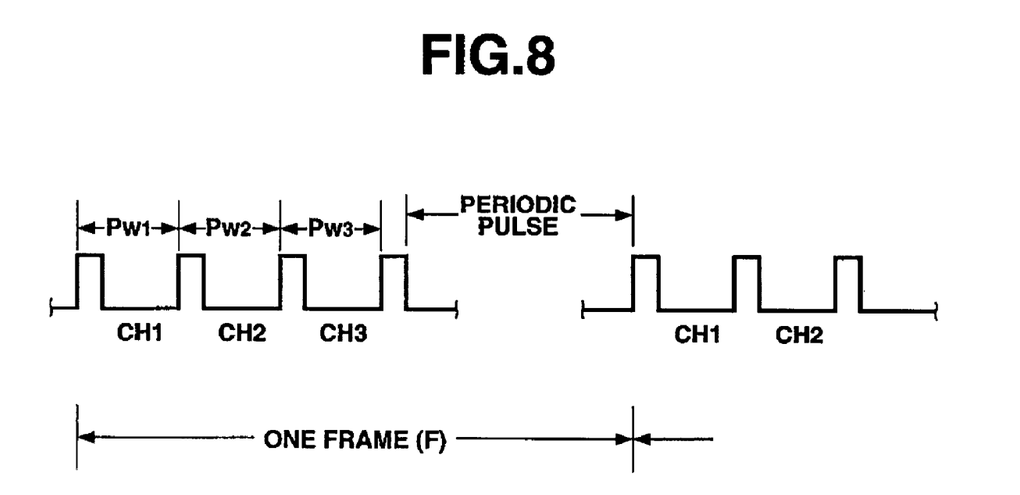
FIG. 8 is waveforms showing a pulse chain of control signals in plural channels.

FIG. 8 shows a pattern of a pulse chain cycled in one frame unit. The direction rotation (rudder or aileron) control signal, rise/fall (elevator) control signal, the speed (engine throttle) control signal and others in the airborne object 13 are converted into pulse signals CH1, CH2, CH3, CH4, . . . as channels 1, 2, 3, 4, . . . , respectively. One frame corresponds to, for example, a pulse chain repetitive in 14 mS to 20 mS.

In further explanation, the intervals Pw1 Pw2, Pw3, . . . of pulse signals CH1, CH2, CH3, . . . are changed based on plural sets of control information, respectively. For example, a change of ±600 µS (corresponding to a rotational angle of about 120° of the rotational shaft of a servo system, mounted on the airborne object 13, acting as an actuator that controls the movable members of the airborne object 13) occurs with respect to the center value of 1520 µS. A synchronous (space) signal of 5 mS is provided to indicate the end of one frame.

Control information of such a type is always transmitted with radio waves to the airborne object 13.

The airborne object 13, on the receiver side, receives the radio waves with, for example, a W super heterodyne receiver. A decoder performs the processing of received signals, demodulates control signals transmitted by the manipulator on the transmission side, separates control signals for respective channels, and supplies the separated signals to the servo system acting as an actuator.

Figure 9A:
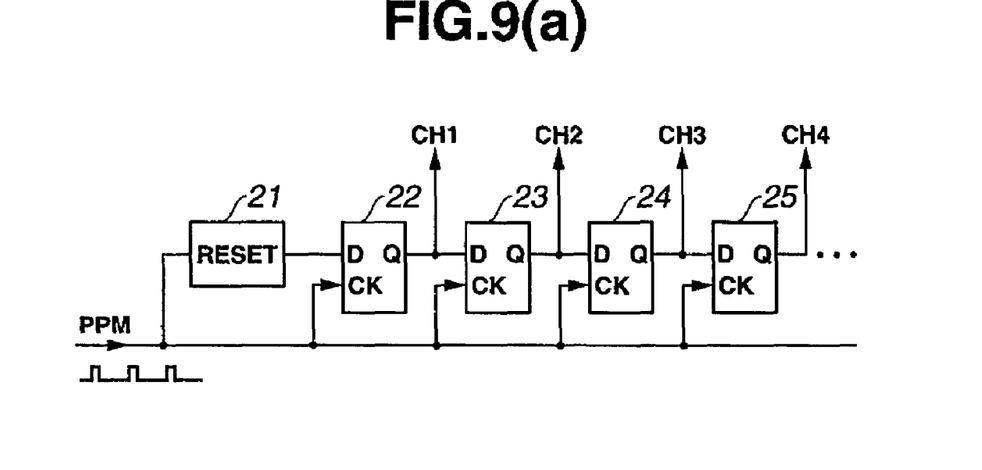
FIG. 9(a) is a block diagram illustrating a decoder that separates and outputs control signals in plural channels and FIG. 9(b) is a diagram illustrating waveforms in the decoder.
Figure 9B:
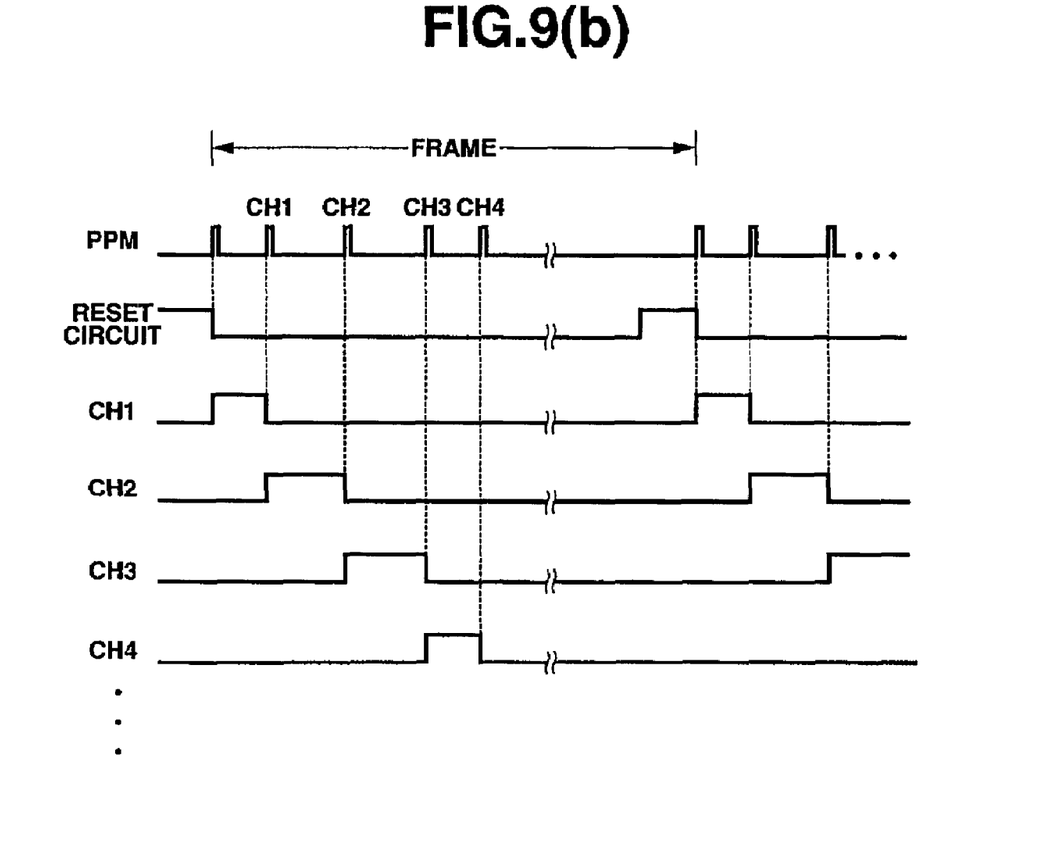

FIG. 9(a) illustrates an outline of a decoder that separates and outputs control signals in respective channels from a chain of decoded pulse string signals (PPM). Numeral 21 represents a reset circuit that produces a detection output to a synchronous signal. Numerals 22, 23, 24, 25, . . . represent D flip-flops (hereinafter referred to as DFFs), respectively.

The demodulated pulse string signal PPM is input to the DFFs (22, 23, 24, 25, . . . ) forming a shift register and to the reset circuit 21.

When detecting an L-level duration of about 5 mS in the pulse string signal PPM, the reset circuit 21 produces a reset signal of a high level and then inputs it to the D input of the first shift register DFF 22. Subsequently, successive pulses are transferred to the shift registers. Thus, as shown with the waveforms in FIG. 7(b), the control signals CH1, CH2, CH3, CH4, . . . which respectively correspond to pulse intervals in a pulse string signal with modulated pulse positions, are output from each stage of the shift register to the servo device.

Here, explanation will be made as the fundamental configuration of the servo device.

The servo device is included in a housing. The housing includes a motor acting as a drive source for the servo device, a reduction gear for reducing and outputting the rotation of the motor, an output shaft for transmitting the output of the reduction gear to the control object of a controlled body, a variable resistor (potentiometer) for detecting a displacement of the output shaft, and a servo circuit for receiving control signals from a receiver and controlling the driving of the servo device.

The servo circuit creates motor drive signals based on input control signals and based on the displacement of the actuator due to the rotation of the output shaft detected by the variable resistor and thus outputs the motor drive signals to the motor to drive the motor controllably.

In the servo device, the motor acting as a drive source is a brushless dc motor (hereinafter referred to as a DC motor). The servo circuit is manufactured as a servo-system DC motor driving integrated circuit.

Figure 10:
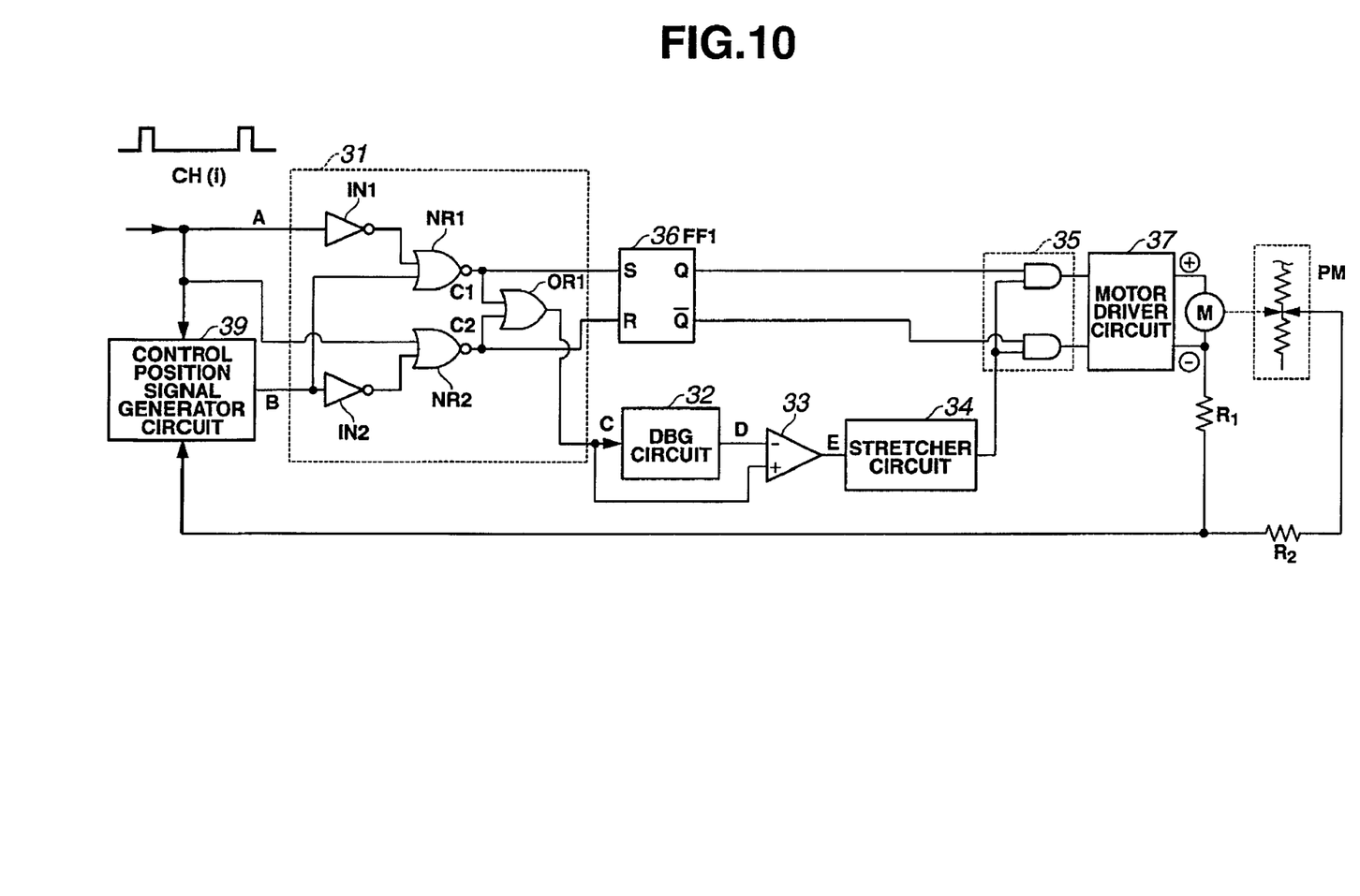
FIG. 10 is a block diagram illustrating a servo-system DC motor drive integrated circuit that controls the driving of a servo device.
Figure 11:
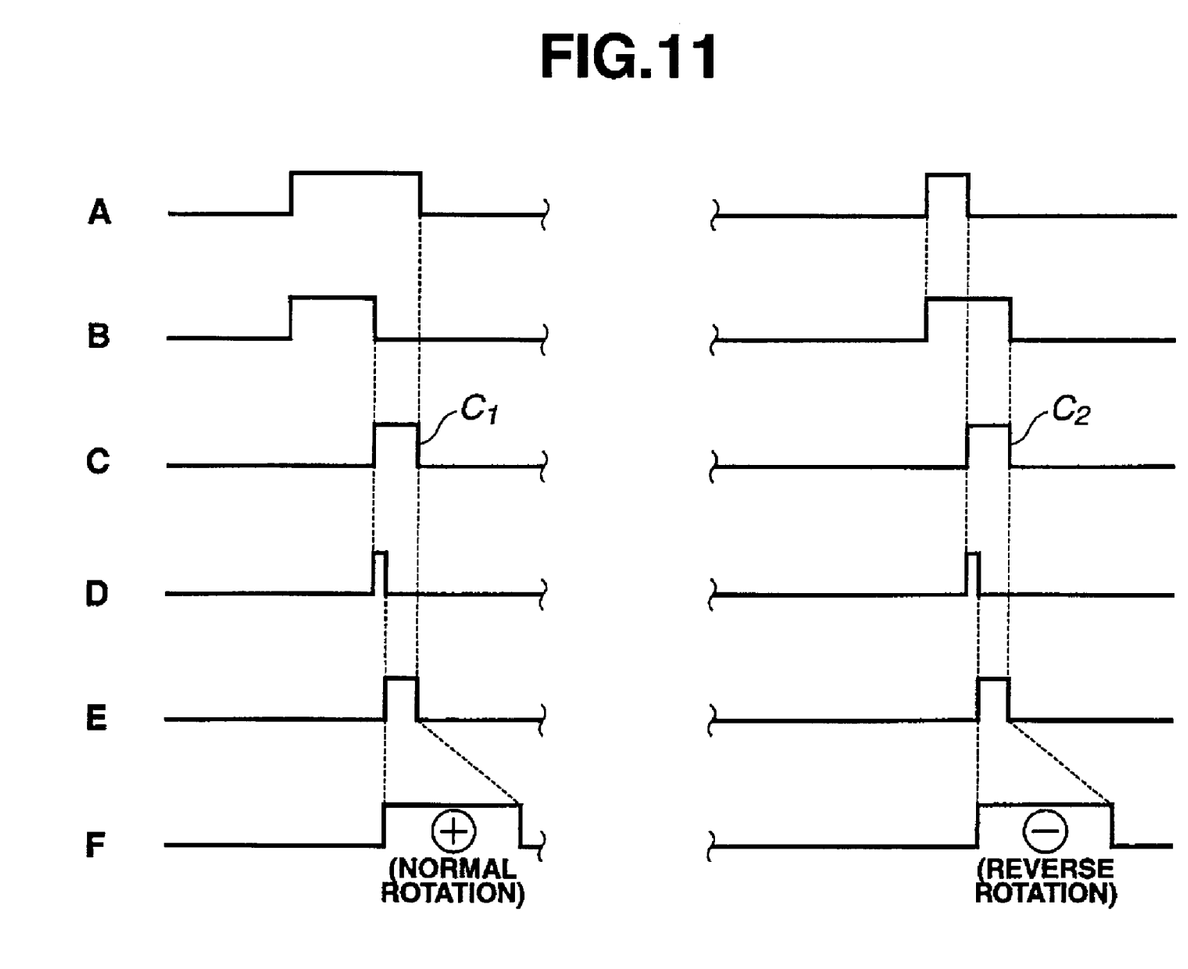
FIG. 11 is a diagram illustrating waveforms at various portions in FIG. 10.

FIG. 10 is a block diagram illustrating the main portion of the servo-system DC motor driving integrated circuit. FIG. 11 shows signal waveforms A, B, C, D, E, and F in respective blocks.

The control pulse signal A in the channel i, extracted as shown in FIG. 11, is supplied to the comparator circuit 31 every one frame period. The control pulse signal A triggers the control position signal generator 39. The comparator circuit 31 compares the control pulse signal A with the sole position pulse signal B.

An exclusive OR circuit (comparator 31) is formed of inverters IN1 and IN2 and NOR circuits NR1 and NR2 and an OR circuit OR1. The exclusive OR circuit receives the control pulse signal A and the position pulse signal B output from the control position signal generator circuit 39. When the control pulse signal A has a pulse width wider than that of the position pulse signal B, the NOR circuit NR1 outputs at its output terminal the pulse C1 (hereinafter referred to as an error pulse signal) corresponding to the difference between the pulse widths of the pulse signals A and B, as shown with the letter C in FIGS. 10 and 11. Moreover, when the position pulse signal B has a pulse width wider than that of the control pulse signal A, the NOR circuit NR2 outputs at its output terminal the error pulse signal C2 corresponding to the difference between the pulse widths of the pulse signals A and B, as shown FIG. 11. The error pulse signal C1 is input to the set terminal S of the flip-flop 36 while the error pulse signal C2 is input to the reset terminal R of the flip-flop 36. As a result, the Q output terminal or the −Q output terminal becomes "1".

Moreover, the dead pulse signal generator circuit (DGB circuit) 32 is triggered by the error pulse signals C1 and C2 via the OR circuit OR1 and thus produces a dead pulse signal D. When the error signal C is smaller than the dead pulse signal D, the voltage of the drive terminal of the DC motor M is held (at a difference voltage of zero) such that both the comparator 33 and the stretcher circuit 34 do not output any signal.

That operation prevents the servo device from being erroneously operated due to external forces or noises applied to the DC motor M for the servo device and provides a dead zone in the control system, thus effectively stabilizing the servo system.

The pulse width of the error signal E output from the comparator 33 is stretched in a predetermined ratio by the stretcher circuit 34. The stretcher circuit 34 outputs its stretched output pulse to the motor drive circuit 37 via the AND circuit AD1 or AD2 to rotate the DC motor M in a predetermined direction.

Thus, by defining the PWM signal width for control with the stretcher circuit 34, the gain characteristic of the servo circuit can be set.

The rotational direction switching circuit 35 changes the rotational direction of the motor according to whether or not the control pulse signal A is larger with respect to the current control position of the motor. For example, by comparing the current position pulse signal B from the control position signal generator circuit 39 and the control pulse signal A, the rotational direction switching circuit 35 can determine the (normal or reverse) rotational direction of the DC motor M.

In the servo device, the rotation of the DC motor M is transmitted to the output shaft via the reduction gear (not shown) to rotationally drive the output shaft.

The potentiometer PM cooperating with the operation of the output shaft outputs as an output signal the voltage indicating the rotational displacement (rotational position) of the output shaft from the potentiometer PM.

The control position signal generator circuit 39 pulse-width modulates the output signal of the potentiometer PM indicating the rotational displacement to produce the position pulse signal B. A change of the resistance value of the potentiometer PM is set to the direction where the position pulse signal B corresponds to the pulse width of the control pulse signal A. By doing so, the resistance value of the potentiometer PM is controlled over plural periods of the control signal received by the receiver. When the pulse width of an output pulse of the control pulse signal A matches with the output width of an output pulse of the position pulse signal B, the OR circuit OR1 does not output its output signal. Thus, the rotation of the DC motor M is stopped to drive the actuator to a target position. Finally, a closed loop of the servo circuit is formed based on the control pulse signal A.

The voltage (counter electromotive voltage) applied to the DC motor M is fed back to the control position signal generator circuit 39 via the resistor R1 to control the rotational speed of the DC motor M.

In the servo-system DC motor driving integrated circuit, the position pulse signal B output from the control position signal generator circuit 39 is narrowed with respect to the pulse width of the control pulse signal A indicating a target value as a pulse width, in the process of arriving at the target position. For the rotational speed adjustment, the voltage induced in the DC motor is fed back to an actual output pulse due to only the potentiometer PM via the resistor R.

The DC motor rotates such that the difference between the pulse width B of the position pulse signal and the control pulse signal A indicating the target position becomes zero. Thus, the DC motor M ceases at the target point.

As described above, the position servo control is performed such that a counter electromotive voltage component indicating the rotational information of the DC motor is fed back together with the signal indicating the rotational position of the DC motor. Thus, the motor can be controlled to decelerate and stop in front of a target position. This can prevent the motor from causing hunting through overrunning the stopping position due to the inertia of the motor.

As to the servo-system DC motor driving integrated circuit used in the conventional servo device, the above-mentioned control-only integrated circuit has been commercialized. Such a DC motor driving integrated circuit can be easily designed comparatively.

However, when the DC motor is continuously operated, for example, in a loaded state or the DC motor itself becomes a high temperature, there is the problem in that the operational life decreases noticeably due to abrasion of the commutating brush supplying current to the rotation coil.

Therefore, in the use of the DC motor to the servo device, there is the problem in that the DC motor always requires maintaining for high reliability.

In order to overcome such problems, it is considered to use, as a drive motor for the servo device, the brushless motor having a relatively high reliability and indicating the state more stabilized to noise signals. However, since such a motor is usually built so as to be rotationally driven with three or more phase drive pulses, even when the brushless motor only driving integrated circuit is used, it is particularly difficult to detect accurately the counter electromotive voltage. Hence, there is the problem in that that motor cannot be simply replaced with the drive motor in the servo device realizing the above-mentioned motor control.

SUMMARY OF THE INVENTION

According to the present invention, in order to overcome the above-mentioned problems, a servo device drives (rotatably drives) a motor by drive signals created based on control information, positional information, and rotational speed information, a drive output of the motor being transmitted to an output shaft via a reduction mechanism. The motor comprises a M-phase brushless motor driven by M-phase drive signals.

The M-phase brushless motor is (rotatably) driven by the output of the brushless motor drive signal generator that creates M-phase drive signals. The M-phase drive signals PWM (pulse width modulation) controls the M-phase drive signals created by the brushless motor drive signal generator based on the rotational speed information of the M-phase brushless motor, input control information, and positional information regarding a detected displacement of the output shaft transmitted via a reduction mechanism.

According to the present invention, the rotational speed information regarding the brushless motor is detected and speed control is performed by adapting, without any change, a servo-system DC motor driving integrated circuit and a brushless motor driving integrated circuit (IC), each being used conventionally. Hence, in the servo device, for example, for model radio control, the drive motor can be easily replaced with a brushless motor.

For that reason, the brushless motor can be adapted to the servo device using the conventional brush-type DC motor, so that the reliability of the servo device can be easily improved.

The heat dissipation characteristics can be improved by using the brushless motor (inner rotor type) where the rotor portion rotating in the inner portion includes the stator coil in the motor housing with respect to the magnet. Moreover, a small inner magnet type brushless motor can decrease the mechanical time constant of an actuator, thus improving the servo characteristics (response characteristics) of remote controlled apparatuses.

According to the present invention, the servo device is driven by the brushless motor and the counter electromotive voltage generated from the brushless motor is fed back to the conventional servo-system DC motor driving integrated circuit. Therefore, this feature can easily improve the reliability of the servo device and can shorten the mechanical time constant, thus promising improved servo response characteristics.

Particularly, since the servo device uses the brushless motor including coils on the stator side and magnets on the rotor side, the heat dissipation characteristics can be more improved, compared with the conventional brush-type DC motor. As a result, the reliability can be improved, compared with the DC motor, which includes coils on the rotor side. Moreover, compared with the case where the same-type motors are used, the output of the motor can be increased.

Moreover, when the present invention is applied to remote control devices of the type, which can deal with different loads, with many standardized servo motors, the controllability can be effectively improved.

BRIEF DESCRIPTION OF THE DRAWINGS

This and other objects, features, and advantages of the present invention will become more apparent upon reading of the following detailed description and drawings, in which.

DESCRIPTION OF THE EMBODIMENTS

Figure 1:
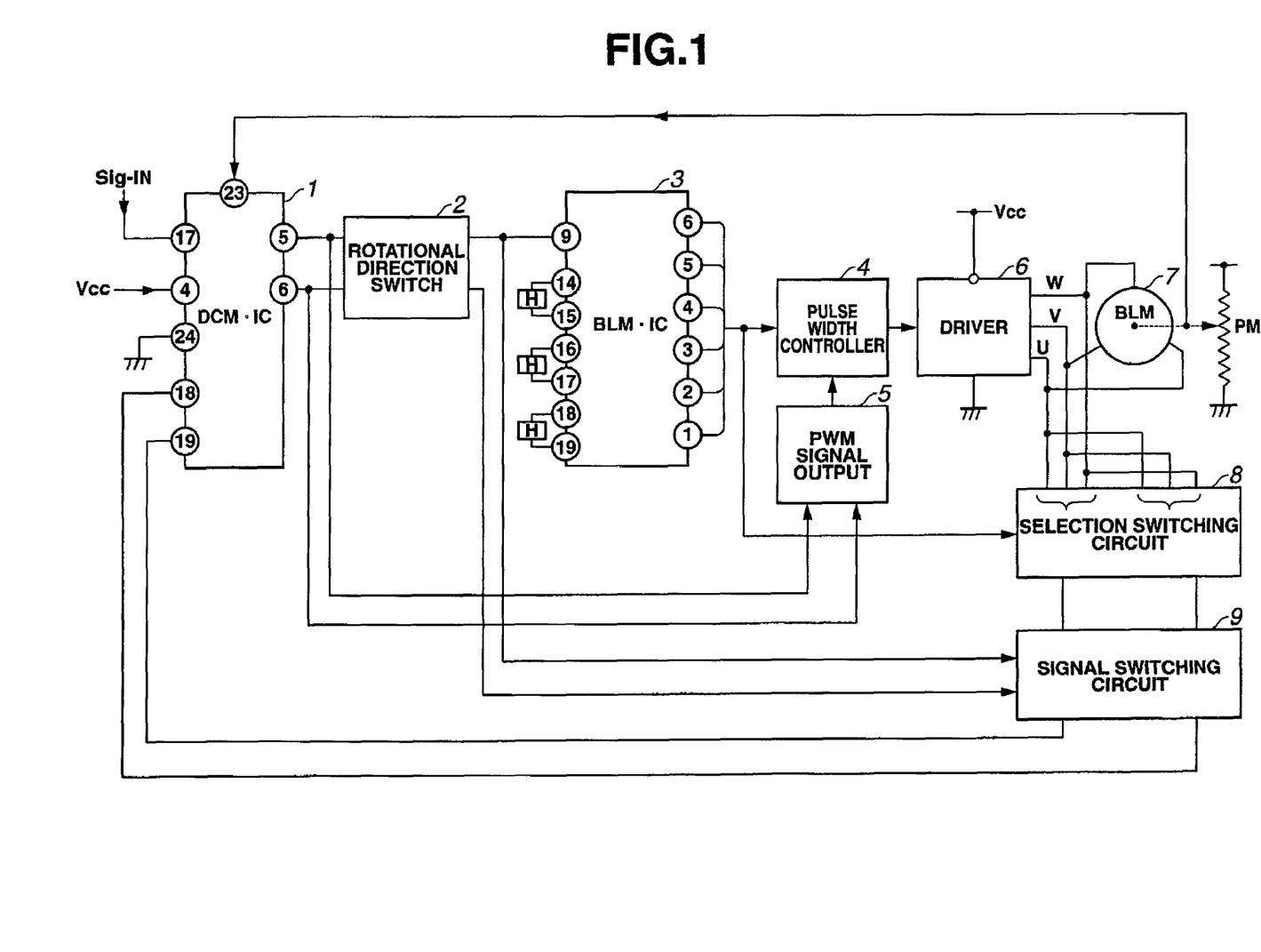
FIG. 1 is an overall block diagram illustrating a servo circuit in a servo device according to the present invention.

FIG. 1 is a block diagram comprehensively illustrating a servo device according to the present invention.

Referring to FIG. 1, numeral 1 represents a conventional DC motor driving integrated circuit (hereinafter referred to as DCM•IC). A specific control pulse signal Sig, as previously explained as the channel pulse CH1 in FIG. 8, input to the servo device is input to the pin "17". The signal at the potentiometer PM, which detects the rotational angle of an actuator, is input as position information to the pin "23". The rotational speed information corresponding to the counter electromotive voltage of a brushless motor (to be described later) are input to the pins "18" and "19".

In the DCM•IC1, the outputs pins "5" and "6" output pulse signals pulse width (PWM) modulated, like the servo device previously explained). The PWM modulated pulse signal is supplied to the integrated circuit 3 (hereinafter referred to as BLM•IC), which drives a M-phase brushless motor 7 (hereinafter M=3 in the present embodiment) via the rotational direction switching section 2, which outputs the signal for indicating a rotational direction.

That is, the output of the rotational direction switching section 2 is input to the BLM•IC pin "9" and its logical value sets the rotational direction of the brushless motor 7.

Figure 2:
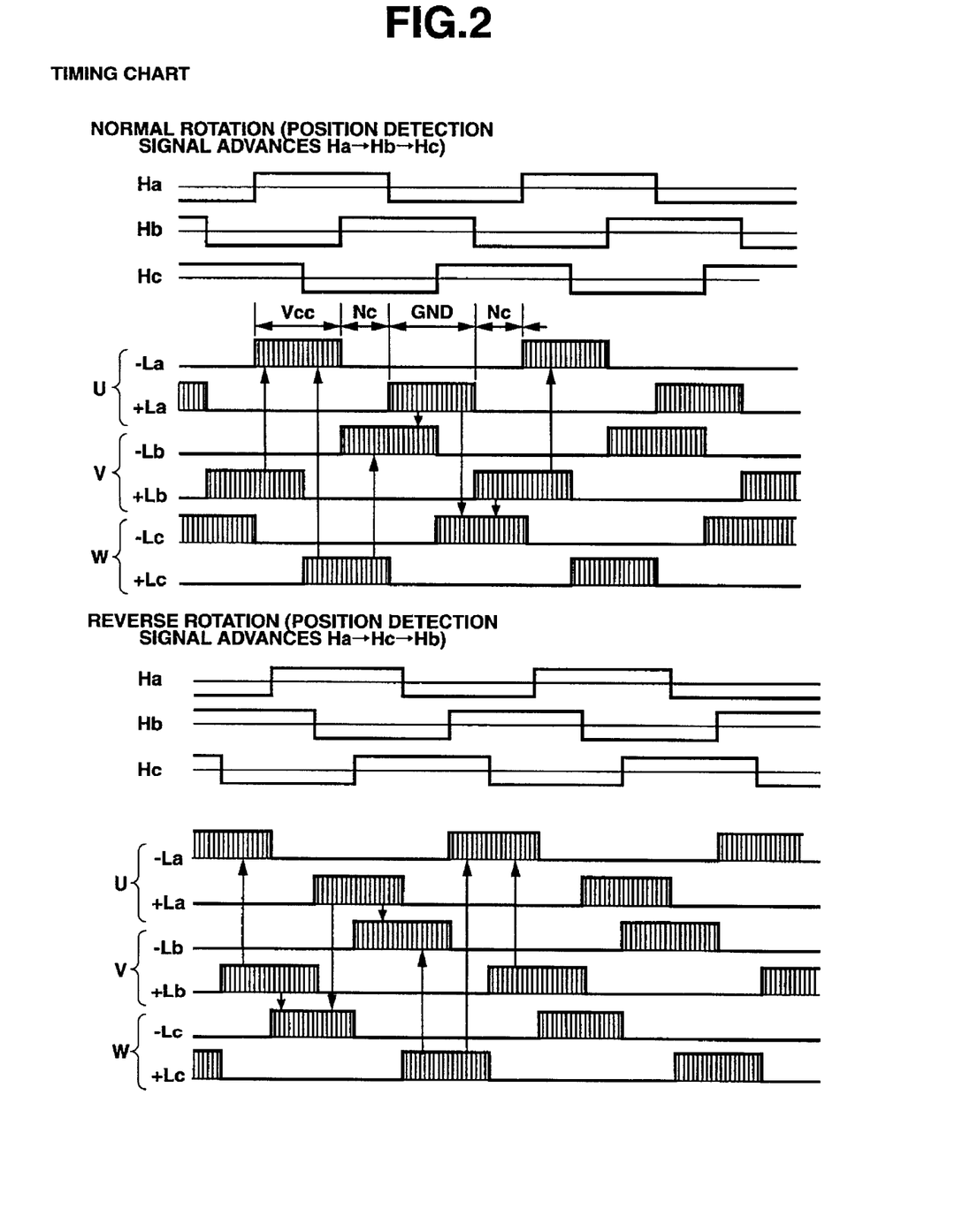
FIG. 2 is a diagram showing timing waveforms of three-phase drive pulse signals for a brushless motor.

As shown with the timing waveforms in FIG. 2, the pins 1, 2, 3, 4, 5 and 6 of BLM•IC 3 output three phase timing pulse signals (U=±La, V=±Lb, W=±Lc) phase-shifted in a predetermined order in normal rotation and reversed rotation. The pulse width controller 4 PWM modulates respective timing pulse signals (−La, +La, −Lb, +Lb, −Lc, +Lc) to form a drive pulse signal for rotational control of the brushless motor. The drive pulse signal is supplied to the driver 6, which is formed of switching circuits for motor driving.

As well known, the phase control of the timing pulse signals (U, V, W) to the three phase brushless motor 7 is performed based on the signals (Ha, Hb, Hc) detected by three Hall elements H. Three Hall elements H, which normally touch internally to the brushless motor 7, are connected to the pins "14" to "19" of BLM•IC3.

In the timing pulse signals (U=±La, V=±Lb, W=±Lc) in FIG. 2 of the present embodiment, the timing period +La, +Lb, +Lc represents the period during which a negative potential or the ground potential (GND) is applied to the stator coil terminal of the brushless motor 7. The timing period −La, −Lb, −Lc represents the period during which the drive voltage (Vcc) is applied to the stator coil terminal of the brushless motor 7.

In the period during which those timing pulse signal (U, V, W) is not supplied, the terminal of each stator coil is driven to be no connection (NC).

The pulse width controller 4 controls the pulse width of the three phase timing pulse signal (U=±La, V=±Lb, W=±Lc) output from BLM•IC 3, based on the signal output from the PWM signal output section 5. Normally, the pulse width controller 4 is formed of plural gate circuits G, each which passes the timing pulse signal (U=±La, V=±Lb, W=±Lc) of each phase for a predetermined duration. The gate time, during which a signal passes by the signal from the PWM signal output section 5, is controlled by, for example, the MOS transistor.

The signal, which is pulse-width controlled by the pulse width controller 4, is supplied as a drive pulse signal to the driver 6, which is formed of switching circuits. By turning on and off switches, which forms the driver 6, drive voltages are supplied to the brushless motor 7, which includes three phase (U, V, W) stator coils La, Lb, and Lc.

In the brushless motor 7, as well known, the magnetized rotor portion is rotatably driven by the M-phase rotational magnetic field. Usually in the case of a three phase brushless motor, rotational magnetic field is created by U-phase (±La), V-phase (±Lb) and W-phase (±Lc) alternating pulse signals, which mutually have a phase difference of 120°. Thus, the brushlesss motor 7 is driven to rotate in a predetermined direction.

The rotational output of the brushless motor 7 moves the actuator of the controller (not shown) to a target position via a reduction gear acting as a reduction mechanism. A position detector, for example, a potentiometer PM, which detects the movement of the brushless motor 7, is disposed.

A selection switching circuit 8 selectively extracts the three-phase terminal voltage of the brushless motor 7 (to be described later) in sync with the timing of the timing pulse signals (U=±La, V=±Lb, W=±Lc) and captures counter electromotive voltage components in the brushless motor 7 produced in rotation. The selection switching circuit 8 outputs its output signal to pins "18" and "19" of the DC motor driving integrated circuit DCM•IC1 via the signal switching circuit 9, which reverses the polarity according to the rotational direction of the motor.

DCM•IC1 outputs the DC motor driving PWM drive signals from pins "5" and "6", based on the control pulse signal Sig input from pin "17" and based on the position signal at pin "23" receiving the output voltage of the potentiometer PM and based on rotational speed information (counter electromotive voltage signal component) of the brushless motor 7 at pins "18" and "19" input from the signal switching circuit 9.

The signals at the pins "5" and "6" are supplied to the PWM signal output section 5.

Figure 3:
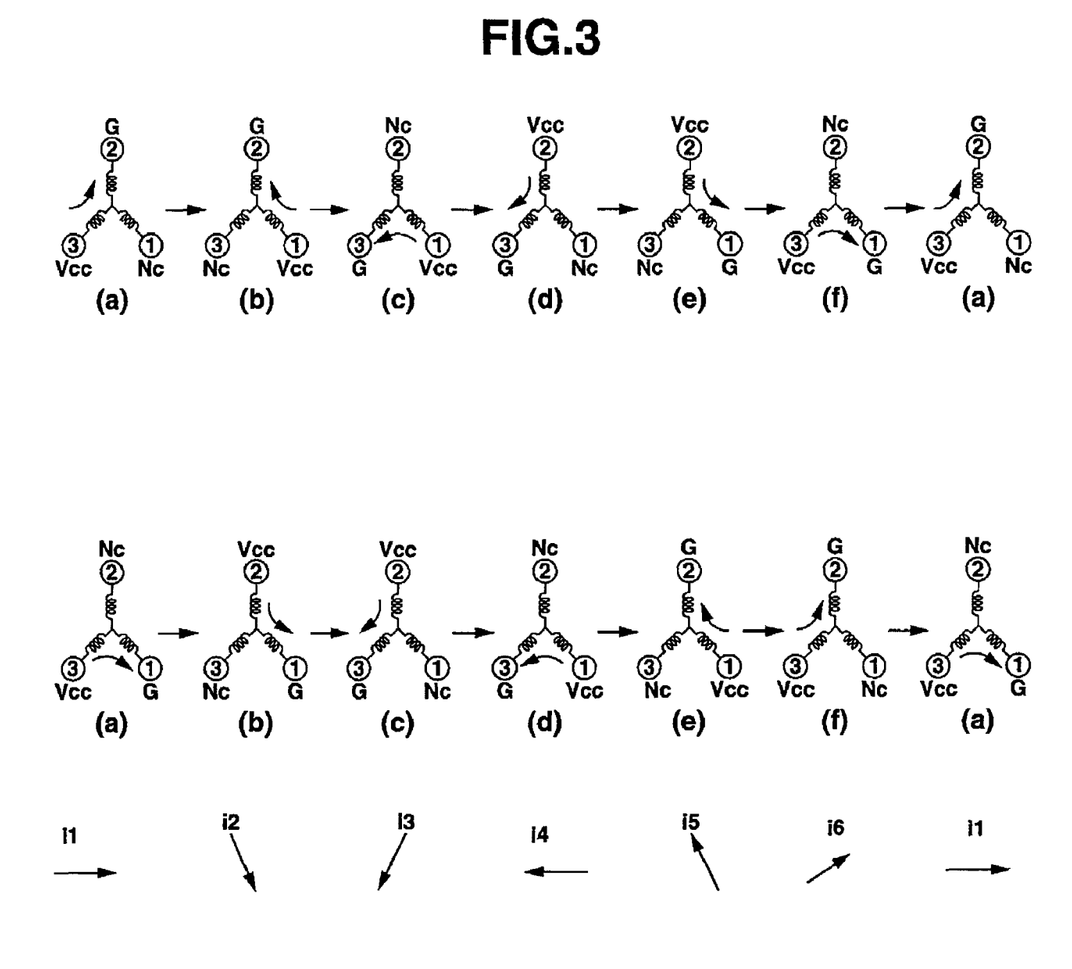
FIG. 3 is a diagram showing the current flowing through motor coils when three-phase pulse signals are applied.

FIG. 3 shows the direction of the current flowing through three-phase stator coils La, Lb, and Lc due to three-phase drive pulses. As to three-phase coil terminals (1), (2) and (3) with a signal waveform with a duty of 100%, one phase coil terminal (1), for example, become a non-connection (NC) state during an electric angle of 60 degrees. With the same timing, a voltage of Vcc-GND(G) or GND-Vcc is applied between other two phase coil terminals (2) and (3).

By supplying three-phase drive pulses in such a pattern, the current i flows through each coil over a lapse of time as shown in FIG. 3 to create a rotational magnetic field to the motor.

Since the changeover order of the current i is reversed in the normal and reversed rotations shown in FIG. 3, a rotational magnetic field for counter-rotating the brushless motor 7 generates.

Figure 4:
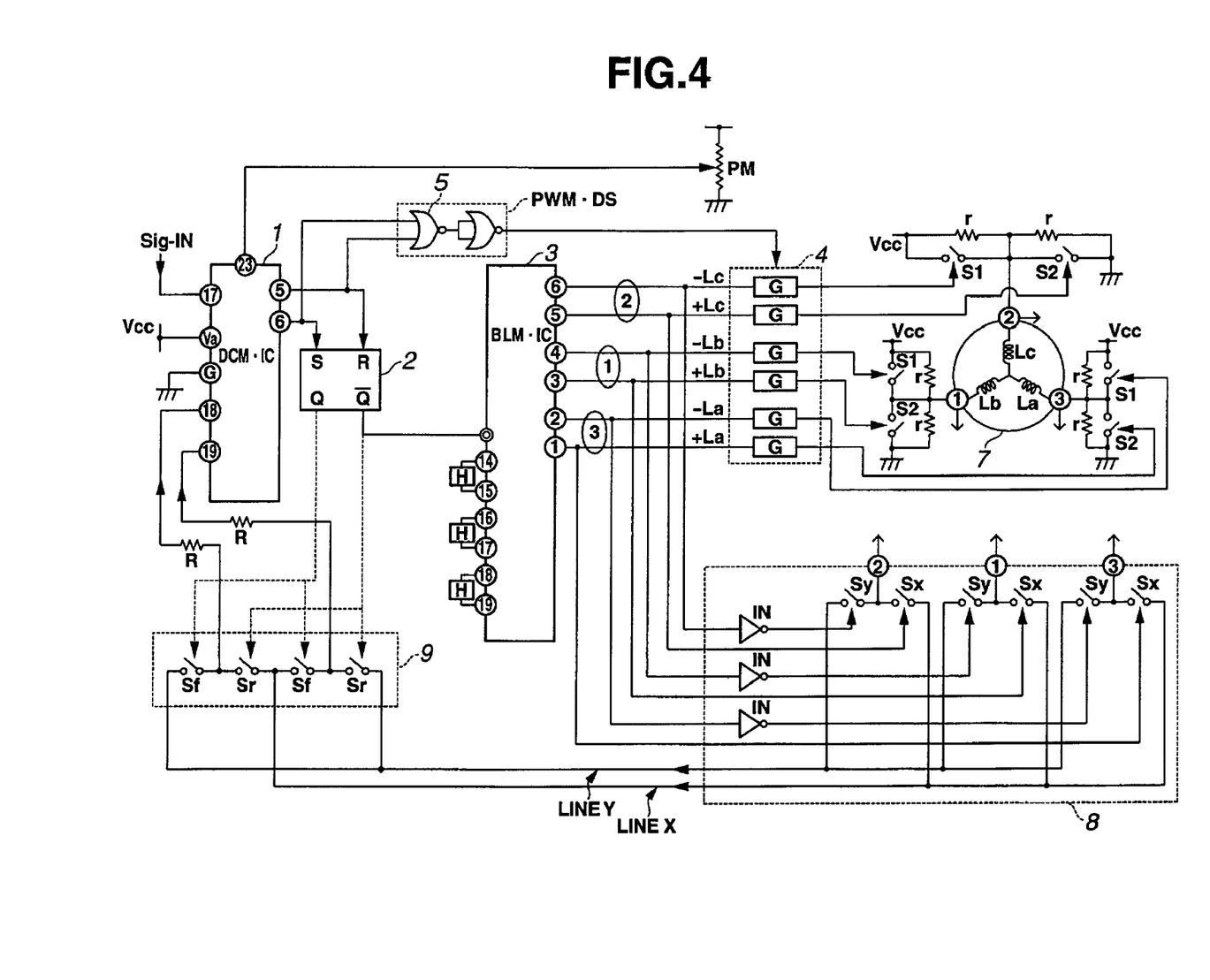
FIG. 4 is a circuit diagram illustrating an embodiment of a servo circuit related to a servo device according to the present invention.

FIG. 4 specifically shows a signal path for supplying signals to the driver 6, a signal path for a selection switching circuit 8 for detecting a counter electromotive voltage from the brushless motor 7, and a signal path for the signal switching circuit 9, in the block diagram of FIG. 1. Like numerals are attached to the same functional portions as those in FIG. 1.

As shown in FIG. 4, switches S1 and S2 are provided as the driver 6. The voltage Vcc or GND potential is applied to the terminals (1), (2) and (3) of the brushless motor 7 via the switch S1 formed of, for example, a P-MOS transistor or the switch S2 formed of, for example, a N-MOS transistor.

In other words, the switch S1 or S2 is on/off controlled with three drive pulse signals, which are pulse-width controlled via the gate G forming the pulse width controller 4.

In the present embodiment, each terminal in the period (NC) during which both the switches S1 and S2 are turned off, receives only the voltage (½ Vcc) divided by the resistor r but is not used as a drive current terminal.

The input terminals (1), (2) and (3) of the selection switching circuit 8 are connected to the three stator coil terminals (1), (2) and (3) of the brushless motor 7, respectively. With the timing of the three phase timing pulse signals (U=±La, V=±Lb, W=±Lc), shown in FIG. 2, signals for turning on and off analog switching groups (Sx, Sy) are supplied to the input terminals (1), (2) and (3).

However, the timing pulse signals of −L(a, b, c) are transmitted via the inverters IN, respectively.

The analog switch Sy turns on via the inverter IN during the output duration of the timing pulse signal (−La, −Lb, −Lc) and selects the terminal having the timing period with which the drive voltage Vcc is applied.

Moreover, the analog switch Sx turns on during the output duration of the timing pulse signal (+La, +Lb, +Lc) and selects the terminal having the timing period with which the ground voltage GND is applied.

When the analog switches Sx and Sy are driven in the signal paths, as shown in FIG. 4, the output of one corresponding to the timing period during which GND is applied, of the terminals (1), (2) and (3) of the brushless motor 7, is connected to the line X. At the same time, the output of one corresponding to the timing period during which Vcc is applied, of the terminals (1), (2) and (3), is connected to the line Y.

Therefore, in the present embodiment, a composite wave of a pulse-width modulated drive voltage component of each phase and a counter electromotive voltage component of a brushless motor is detected from the signal extracted by the analog switches Sx and Sy. The detected voltage is input as rotational speed information to DCM•IC via the analog switches Sf and Sr, which forms the signal switching circuit 9 controlled such that the polarity is reversed according to the rotational direction of the brushless motor.

The terminal voltages of the stator coils La, Lb and Lc of the brushless motor 7 will change due to the counter electromotive voltage induced by the rotation of the rotor. When the terminal voltages are input to the DC motor driving integrated circuit (DCM•IC) 1, the PWM control signal, output from the integrated circuit, becomes a speed controlled signal. The pulse widths of the three phase timing pulse signals (U, V, W) output from BLM•IC 3 are controlled based on the PWM control signal, that is, the pulse width controller 4 PWM-modulates the timing pulse signals to form PWM modulated drive pulse signals. Thus, by driving the driver 6 with the drive pulse signals, the rotational speed of the brushless motor 7 can be controlled.

Figure 5A:
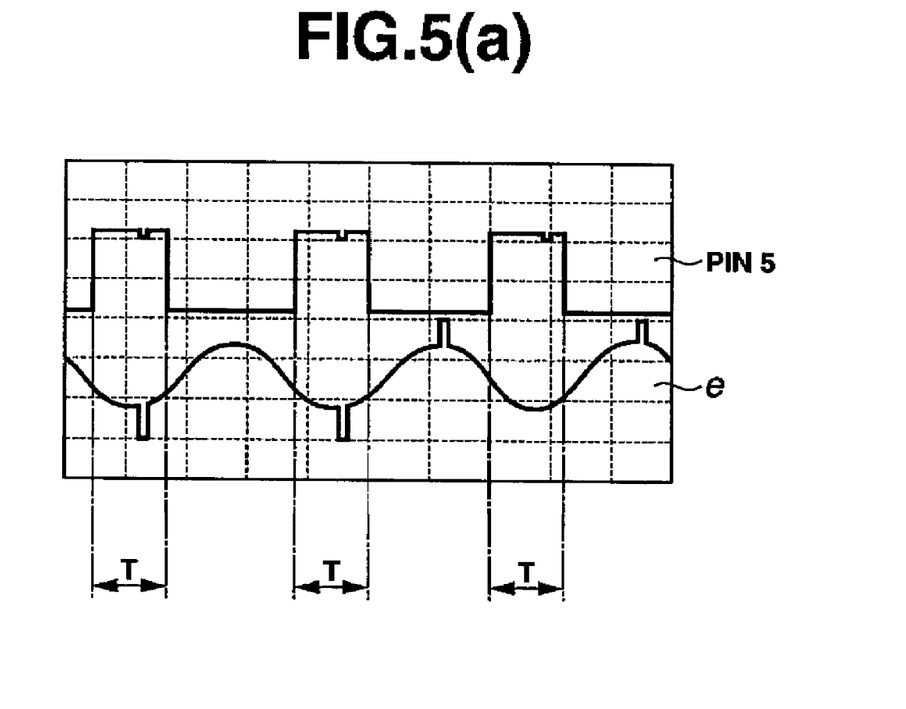
FIG. 5 is waveforms illustrating the phase relationships between drive signals and induced voltages in a brushless motor.

FIG. 5(*a*) shows a signal waveform of the timing pulse signal +Lc output from the pin "5" of BLM•IC3 and an alternating waveform of an induced voltage e at the stator coil terminal (2) generated due to the rotation of the brushless motor 7.

Figure 5B:
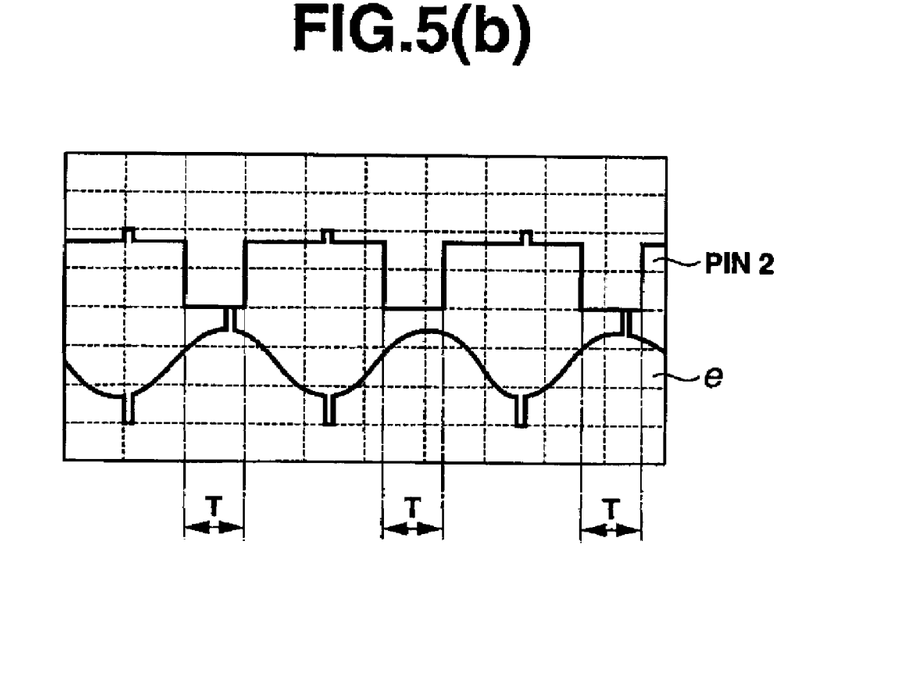
Figure 6A:
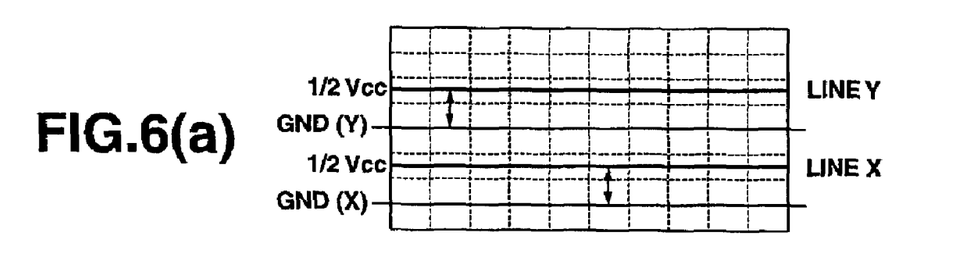
FIG. 6 is waveforms showing counter electromotive voltages when the number of revolutions of a brushless motor increases.
Figure 6B:
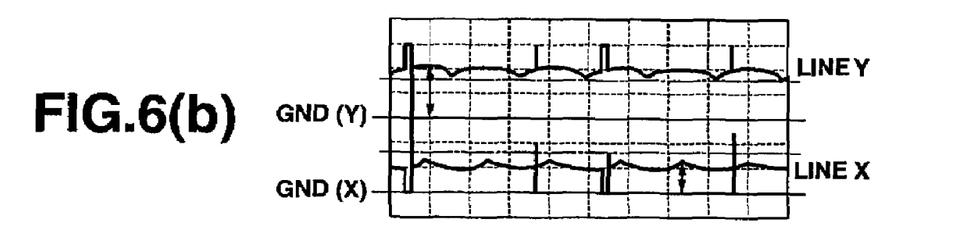
Figure 6C:
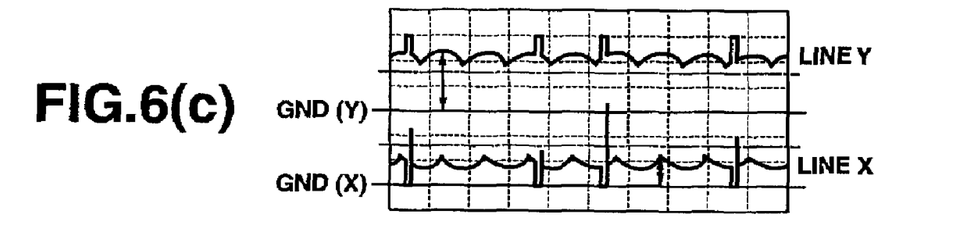
Figure 6D:
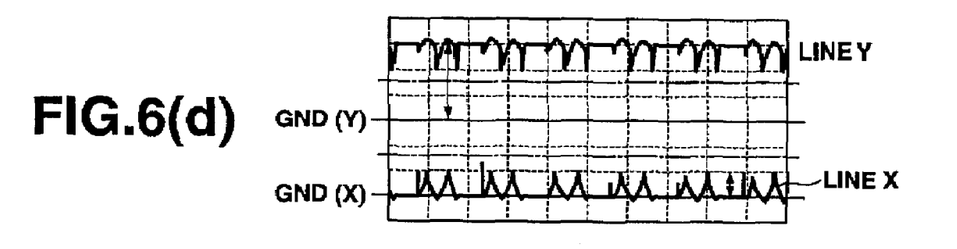
Figure 6E:
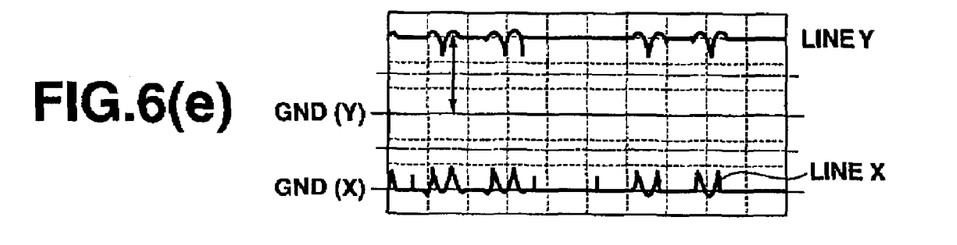

FIG. 5(*b*) shows a signal waveform of the timing pulse signal −Lc output from the pin "2" of BLM•IC3 and an alternating waveform of an induced voltage e at the stator coil terminal (3) generated due to the rotation of the brushless motor 7.

The selection switching circuit 8 is controlled so as to capture the induced voltage e corresponding to the counter electromotive voltage of the brushless motor 7 in the timing period shown with the timing pulse signal T.

FIGS. 6(*a*) to 6(*e*) show signal waveforms of counter electromotive voltages when the brushless motor increases the number of revolutions from a stationary state.

FIG. 6(*a*) shows observed signal waveforms in two channels including the output levels of the lines X and Y with respect to the ground voltage GND, with the rotation of the brushless motor ceased. In the embodiment shown in FIG. 4, the stator coil terminal voltage is at a dc voltage of about ½ Vcc with respect to the ground potential GND.

When three-phase drive pulse signals are applied to rotate the brushless motor and the pulse width of each drive pulse signal is spread sequentially, the rotation of the motor increases. Meanwhile, as shown in FIGS. 6(*b*) to 6(*e*), signal waveforms, each in which a pulse drive voltage component and an induced voltage are combined, generate as rotational speed information (signal) on the lines X and Y.

When the rotational speed of the motor increases, the voltages of the lines Y and X vary with the levels shown with the arrows. The frequency of each waveform increases as a matter of course.

The selection switching circuit 8 selectively outputs the amplitude of the detected signal waveform and the signal switching circuit 9 switches the polarity of the detected signal waveform according to the output of the rotational direction switching section 2.

The signal switching circuit 9 on/off controls the analog switches Sf and Sr, according to the motor normal/reversed rotation signals and reverses the polarity of the rotational speed information (signal) to be supplied to the pins "18" and "19". When the rotational speed information is fed back to the control input terminal of the conventional DCM•IC1, even the three-phase brushless motor can perform speed control under the position servo control, in the same manner as that in the conventional DC motor.

In that case, a filter is preferably inserted to the lines X and Y detecting the rotational speed information to remove noise components.

When the rotational speed information is used for the rotational control of the brushless motor, the damping resistor R, which adjusts the servo gain, is properly adjusted. Thus, in order to stop, for example, the actuator connected to the motor at a target position, the rotational control can be performed to obtain an optimum response characteristic (with no overrun or no slow response).

The analog switches shown in FIG. 4 may be fabricated in a one-chip integrated circuit.

In the above embodiment, the selection switching circuit 8 derives, as rotational speed information for the brushless motor 7, the stator coil terminal voltage in the period during which the timing pulse signal is applied. Alternatively, only the induced voltage caused by the motor rotation may be extracted as rotational speed information. That is, in the stator coils of the brushless motor 7, the terminal is selected, as rotational speed information, in the period during which three phase timing pulse signals (U, V, W) are not applied (for example, in the non-connection (NC) duration in FIG. 2). Meanwhile, the terminal in the period during which the ground potential is applied is selected by the selection switching circuit 8. Thus, the terminal voltages are output onto the lines X and Y.

A best mode of the servo device of the present invention has been explained according to the embodiments. However, the present invention should not be limited only to the proposed embodiments. Various other embodiments will be considered within the scope of the technical matters defined in the attached claims.

What is claimed is:

1. A servo device comprising,
 a M-phase brushless motor driven by a M-phase drive signal;
 a brushless motor drive signal generator for creating the M-phase drive signal to drive said M-phase brushless motor;
 a position detector for detecting the position of an output shaft transmitting a drive output of said M-phase brushless motor via a reduction mechanism;
 a rotational speed detector for detecting the rotational speed of said M-phase brushless motor;
 a PWM control signal generator for producing a PWM control signal to control said M-phase drive signal created by said brushless motor drive signal generator, based on input control information, positional information detected by said position detector, and rotational speed information detected by said rotational speed detector; and
 a signal switching circuit for reversing the polarity of the output of the rotational speed detector according to the rotational direction of the brushless motor;
 wherein said rotational speed information selects a stator coil terminal of said brushless motor by the selection switching circuit, which is controlled based on a M-phase drive signal output from said brushless motor drive signal generator, and is created by a terminal voltage of said stator coil.

2. The servo device as defined in claim 1, wherein said selection switching circuit selects a stator coil terminal voltage in a timing period during which a M-phase drive signal is applied.

3. The servo device as defined in claim 1, wherein said selection switching circuit selects a stator coil terminal voltage in a timing period during which a M-phase drive signal is not applied.

4. The servo device as defined in claim 1, wherein said PWM control signal generator is configured of a servo system DC motor integrated circuit.

5. The servo device as defined in claim 1, wherein said servo system is used to drive various portions of a model body controlled wirelessly and remotely.

* * * * *